United States Patent
Payton et al.

(10) Patent No.: US 10,254,426 B2
(45) Date of Patent: Apr. 9, 2019

(54) FIBER OPTIC SENSOR ARRAY FOR ELECTROMAGNETIC DATA COLLECTION

(71) Applicant: DEEP IMAGING TECHNOLOGIES, INC., Tomball, TX (US)

(72) Inventors: Robert Michael Payton, Tomball, TX (US); Trevor Keith Charles Pugh, Tomball, TX (US)

(73) Assignee: Deep Imaging Technologies, Inc., Tomball, TX (US)

( * ) Notice: Subject to any disclaimer, the term of this patent is extended or adjusted under 35 U.S.C. 154(b) by 0 days.

(21) Appl. No.: 15/111,465

(22) PCT Filed: Jan. 13, 2015

(86) PCT No.: PCT/US2015/011112
§ 371 (c)(1),
(2) Date: Jul. 13, 2016

(87) PCT Pub. No.: WO2015/106236
PCT Pub. Date: Jul. 16, 2015

(65) Prior Publication Data
US 2016/0349396 A1 Dec. 1, 2016

Related U.S. Application Data

(60) Provisional application No. 61/926,448, filed on Jan. 13, 2014.

(51) Int. Cl.
*G01V 1/22* (2006.01)
*G01V 3/08* (2006.01)
*G01V 1/24* (2006.01)

(52) U.S. Cl.
CPC ............. *G01V 3/083* (2013.01); *G01V 1/24* (2013.01); *G01V 1/226* (2013.01); *G01V 2003/085* (2013.01)

(58) Field of Classification Search
CPC ........ G01R 33/032; G01V 1/24; G01V 1/226; G01V 8/00; G01V 3/083
USPC ................................................ 324/244.1, 345
See application file for complete search history.

(56) References Cited

U.S. PATENT DOCUMENTS

| 4,442,350 | A | | 4/1984 | Rashleigh |
| 4,450,406 | A | * | 5/1984 | Bobb ................... G02B 6/4457 250/227.19 |
| 4,609,871 | A | * | 9/1986 | Bobb ................... G02B 6/4457 250/227.19 |
| 4,622,460 | A | | 11/1986 | Failes et al. |

(Continued)

OTHER PUBLICATIONS

Yang et al., Optic Fiber Magnetic Field Sensors with TbDyFe Magnetostrictive Thin Film as Sensing Materials, Nov. 2009.*

(Continued)

*Primary Examiner* — Patrick Assouad
*Assistant Examiner* — Demetrius R Pretlow
(74) *Attorney, Agent, or Firm* — Blank Rome, LLP

(57) ABSTRACT

An electromagnetic sensitive fiber optic sensor, including a cylinder portion with a hole through the center, where a surface of the cylinder portion includes a magnetostrictive material, and a fiber cable threaded through the cylinder portion and wrapped around the cylinder portion multiple times. In another embodiment, a mandrel surrounds a magnetorestrictive or piezoelectric material and the fiber cable is wrapped around the mandrel.

10 Claims, 4 Drawing Sheets

(56) References Cited

U.S. PATENT DOCUMENTS

| | | | | |
|---|---|---|---|---|
| 4,733,938 | A | * | 3/1988 | Lefevre .................... G02F 1/09 324/244 |
| 4,799,202 | A | | 1/1989 | Assard |
| 4,868,495 | A | | 9/1989 | Einzig et al. |
| 5,095,514 | A | * | 3/1992 | Curtis ................ G01D 5/35377 385/12 |
| 5,483,161 | A | | 1/1996 | Deeter et al. |
| 7,268,863 | B2 | | 9/2007 | Payton |
| 2002/0126979 | A1 | | 9/2002 | Koch et al. |
| 2013/0056197 | A1 | | 3/2013 | Maida et al. |
| 2013/0154632 | A1 | * | 6/2013 | McEwen-King ........................... G01R 33/0327 324/244.1 |
| 2013/0301978 | A1 | * | 11/2013 | Meyer ................ G01D 5/35358 385/12 |

OTHER PUBLICATIONS

PCT Search Report and Written Opinion filed in co-pending PCT Application No. PCT/US2015/011112 dated May 6, 2015, 6 pages.
International Search Report and The Written Opinion of the International Searching Authority, dated May 6, 2015, 6 pages.
Extended Euporean Search Report, dated Aug. 9, 2017, 8 pages.
Davion, D., et al., (2008), "Compensation of hysteresis in magnetic field sensors employing Fiber Bragg Grating and magneto-elastic materials", Sensors and Actuators A: Physical 147, pp. 127-136.

* cited by examiner

FIBER OPTIC SENSOR ARRAY FOR ELECTROMAGNETIC DATA COLLECTION

CROSS REFERENCE TO RELATED APPLICATIONS

This Application claims benefit under 35 U.S.C. 371 to PCT Application No. PCT/US2015/011112 filed Jan. 13, 2015, which claims priority to U.S. Provisional Application Ser. No. 61/926,448 entitled "FIBER OPTIC SENSOR ARRAY FOR ELECTROMAGNETIC DATA COLLECTION" filed Jan. 13, 2014, both of which are incorporated by reference in their entirety herein.

TECHNICAL FIELD

The invention relates to the field of Controlled Source Electromagnetic (CSEM) Surveying, Magnetoturelics (MT), and Seismic and Micro-Seismic surveying and various shortcomings in the technique related to resolution and sensitivity of the recording instrumentation and sensors.

BACKGROUND ART

In the fields of Controlled Source Electromagnetic Surveying and Seismic surveying there is a desire to collect high resolution data from as many points and orientations in the area of interest as is possible. Currently, this leads to a plurality of signal receiving devices that are laid out in a matrix or other arrangement over the area of interest. In addition there are various techniques that are used to move the very high data volumes collected toward a central processing system. These methods include wireless transmission of data, data storage and subsequent collection.

DESCRIPTION OF EMBODIMENTS

The disclosed subject matter relates to the field of Controlled Source Electromagnetic (CSEM) Surveying, Magnetoturelics (MT), and Seismic and Micro-Seismic surveying and various shortcomings in the technique related to resolution and sensitivity of the recording instrumentation and sensors. A new sensor is provided that is a combination of an optical fiber that has been modified to have sections along its length coated or combined with a magnetostrictive and piezoelectric material, with the technique of spread spectrum virtual sensors using natural fiber span reflectometers or fiber brag gratings (FBG). The magnetostrictive material makes the fiber sensitive to magnetic field variations. The piezoelectric material makes the fiber sensitive to electric field variations. Fibers are naturally sensitive to acoustic or pressure waves and temperature changes.

These types of sensors are particularly useful when recording data for interferometry and synthetic aperture soundings with electromagnetic signals. The practical implementation of the large sensor arrays required to make these measurements effective is greatly simplified with the proposed electromagnetic sensitive fiber optic sensor array.

Recent advances in techniques for depositing materials onto fiber optic cables allow the creation of several types of sensors that improve the way in which data is collected for both CSEM and Seismic surveying. These techniques are described along with figures of the proposed sensors in 'Fiber-optic magnetic field sensors' by Erin Tate and 'Optic fiber magnetic field sensors with TbDyFe magnetostrictive thin film as sensing materials' by Yang et al. Examples of the Terfenol-D (TbDyFe) magnetostrictive material can be found at Etrema Products of Ames, Iowa, both of which are incorporated by reference herein.

Figure 1A:
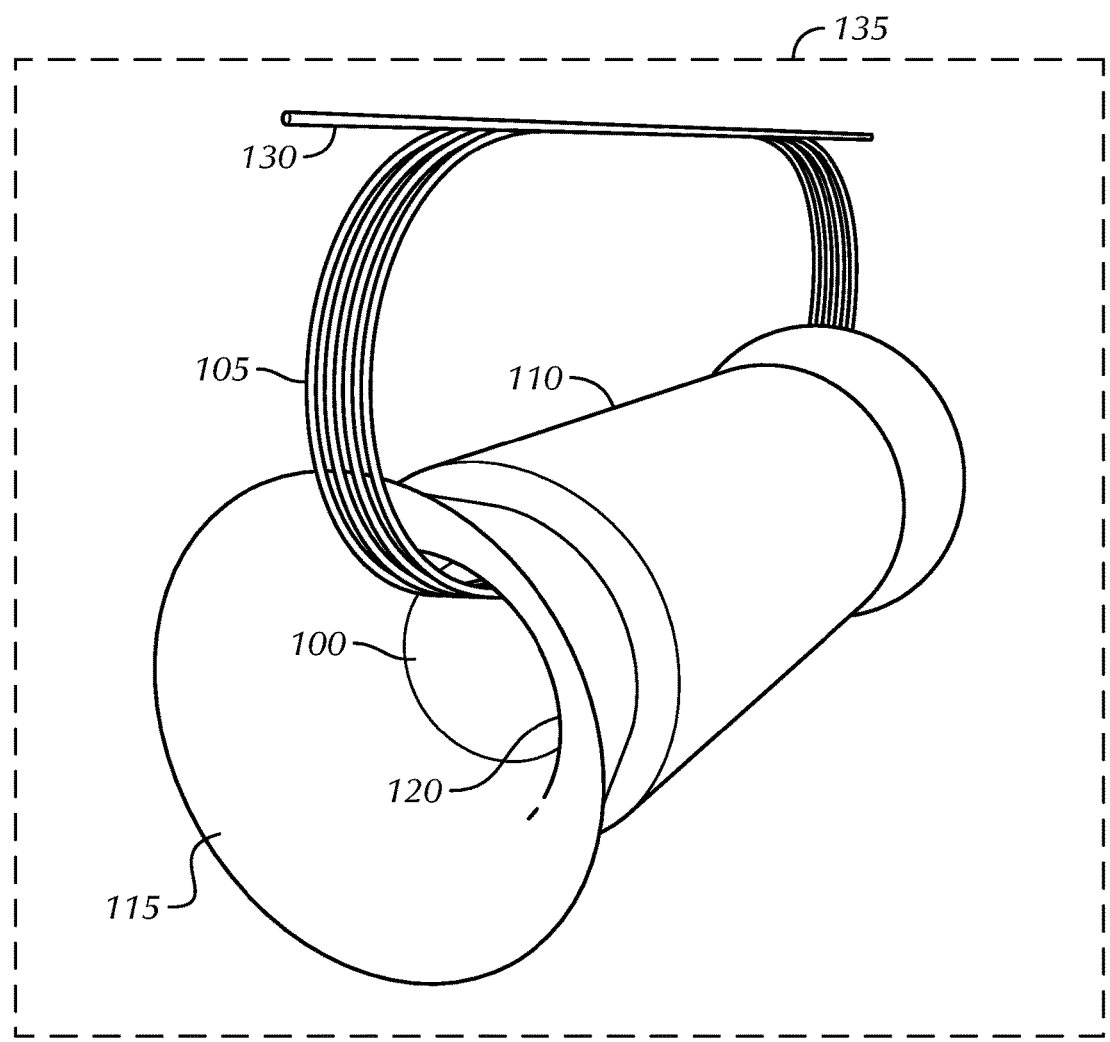
FIG. 1A shows an embodiment of the electromagnetic sensitive fiber optic sensor.
Figure 1B:
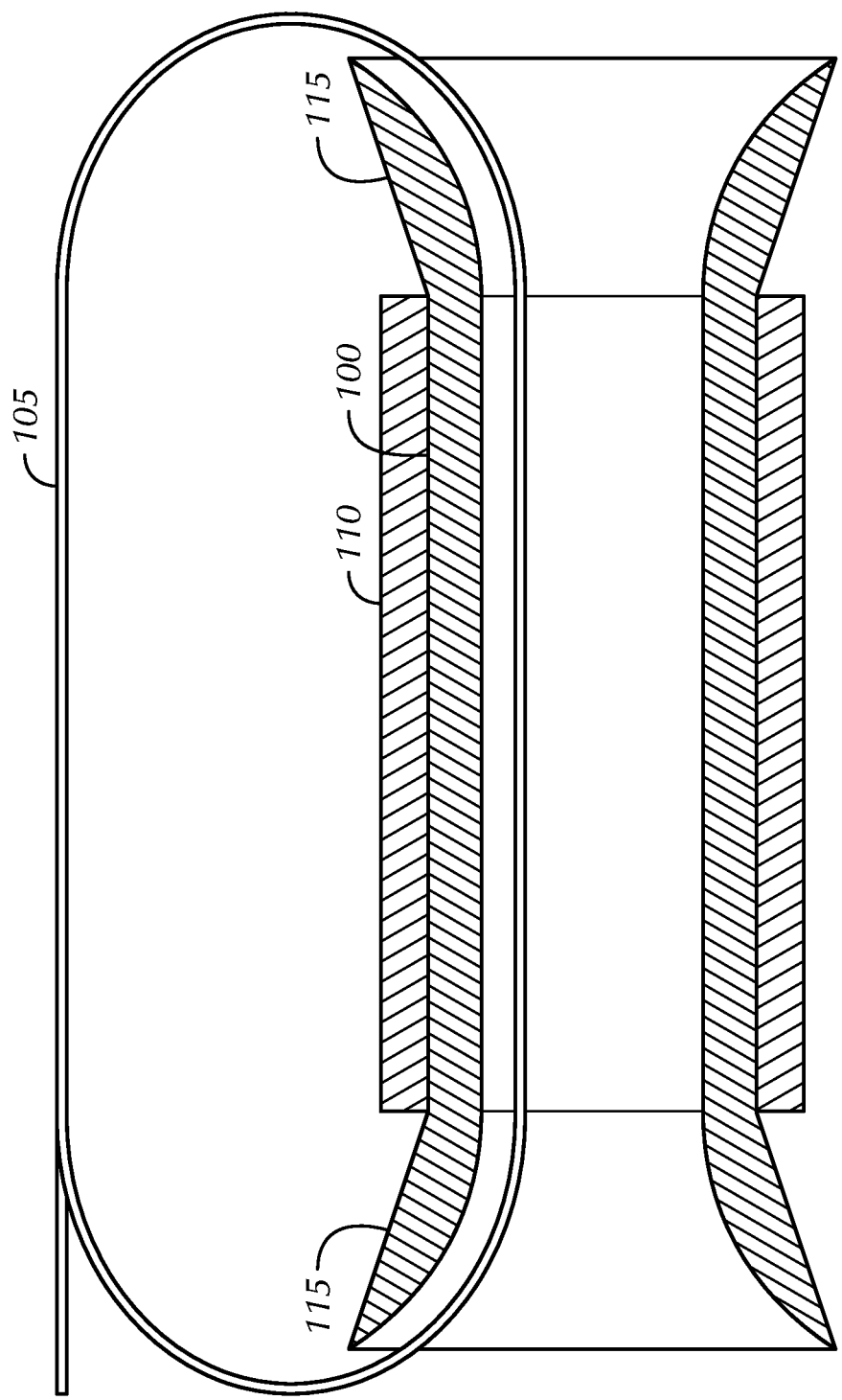
FIG. 1B shows an embodiment of the electromagnetic sensitive fiber optic sensor.

FIGS. 1A and 1B show an embodiment of the electromagnetic sensitive fiber optic sensor 135. The magnetorestrictive material or piezoelectric material 100 is constructed in a cylinder form with a hole through the center to allow the fiber cable 105 to be threaded and wrapped multiple times through the magnetorestrictive material 100. Examples of the magnetorestrictive material include materials such as Terfenol-D (TbDyFe) which may be found at Etrema Products of Ames, Iowa.

It can be shown that the number of turns of the fiber is proportional to the sensitivity of the sensor. For a magnetostrictive rod of length L, placed in a magnetic field of strength B:

$$\frac{\Delta \phi}{\Delta B} = \mu_r \mu_0 K L n_0 \varepsilon \qquad (1)$$

Where: $n_0 = 1.47$, $$K = \frac{2\pi}{\lambda},$$

$\Delta\varnothing$=change in phase of 1550 nm laser,
$\Delta B$=change in magnetic field
$\varepsilon$=magnetostrictive sensitivity Careful selection of the fiber optic cable 105 will ensure minimal attenuation due to the wrapping through the mandrel. An example of bend insensitive fiber is Corning RC 1550 and is manufactured by Dow Corning located in Canton, N.Y.

The equations above shows the relationship between the change in the magnetic field and the phase change that results from 1550 nm laser light being used to obtain a signal that is proportional the change in unit length of the magnetostrictive material due to the impinging magnetic field.

Referring again to FIG. 1a and FIG. 1b, the fiber optic magnetostrictive sensor 135 is a single axis assembly. The fiber optic cable 105 is attached rigidly at each end of the magnetostrictive material 100 at 120 and 125. The fiber optic cable between these two points of attachment, 120 and 125 is pre-stressed and is able to expand and contract along with the magnetostrictive material 100. The fiber optic cable 105 is wrapped through the magnetostrictive material 100, multiple times.

Using a pair of FBG's 130 allows an electronic system, such as that specified in Reference 1, to create a value that indicates the change in the overall dimension of the magnetostrictive material 100 that is proportional to magnetic field 140 impinging on the sensor. The FBG's 130 are placed within the fiber optic cable 105 at a position before and after the sensor that allows a measurement to be made that will emphasis any dimensional changes in length of the magnetostrictive material 100.

The magnetic field 140 is also concentrated by a Permalloy flux concentrator 115 to improve sensitivity.

Figure 2:
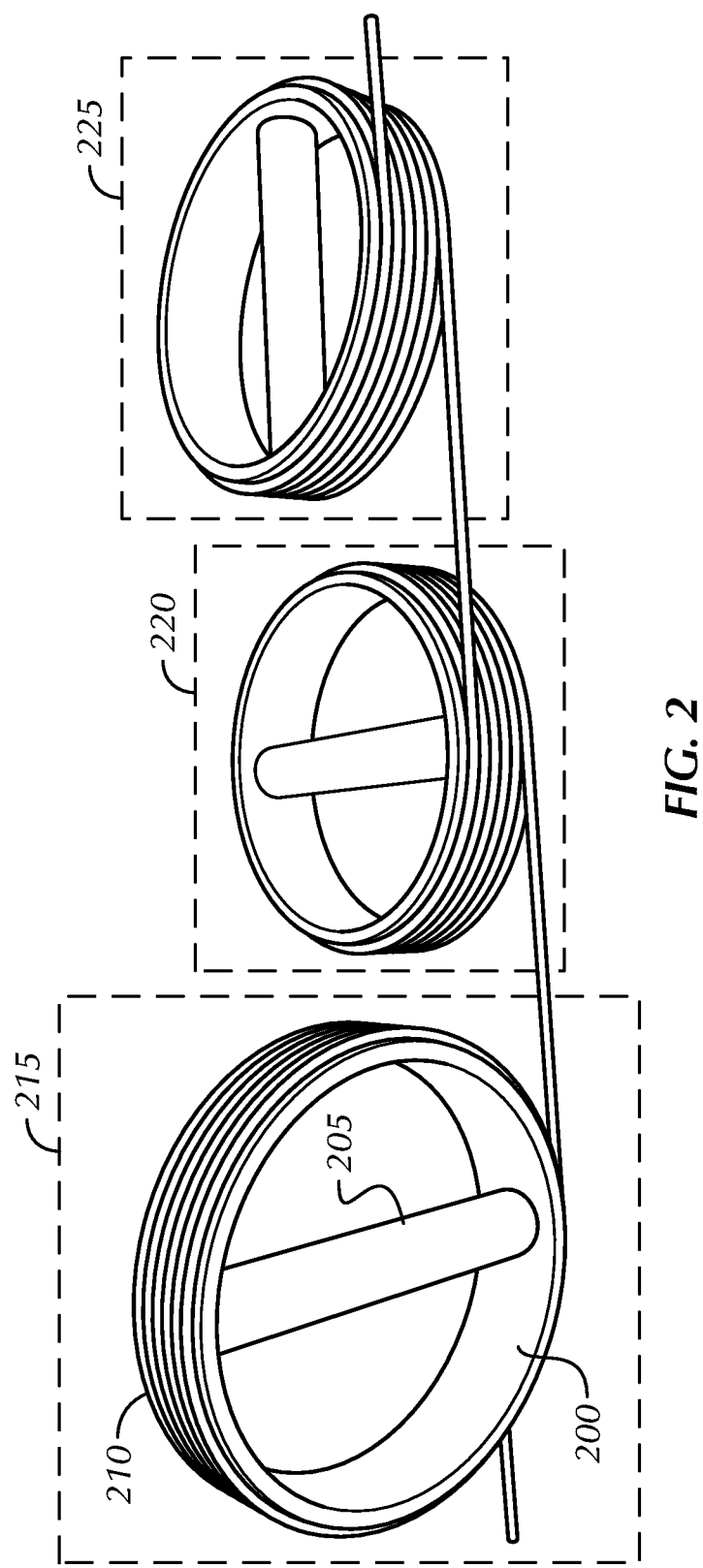
FIG. 2 shows an embodiment of the magnetostrictive sensor.

The fiber optic magnetostrictive sensor 135 may be daisy chained with two other fiber optic magnetostrictive sensors to form a 3 axis sensor that is sensitive in three orthogonal directions Now referring to FIG. 2. An alternate embodiment of the magnetostrictive sensor type has a mandrel 200 that surrounds a magnetostrictive or piezoelectric material 205 that is then wrapped by a fiber optic cable 210. The number of wraps is proportional to sensitivity. The sensor can be daisy chained to form a 3 axis measurement. The Y axis 215, the Z axis 220 and the Y axis 225.

The piezoelectric sensor uses a relaxor electrostrictive polymers (REP) as the loaded member. The REP sensor is preloaded to ensure resonance over the Extremely low frequency (ELF) and Ultra low frequency (ULF) band over which the CSEM system operates. The preloaded REP sensor is then wrapped with the fiber optic cable as shown in FIG. 2. An example of the REP material is manufactured by Piezotech S.A.S. located in Hésingue—France and may be found at the following website:

www.piezotech.fr/fr/2-products-piezoelectric-polymers/news/news-38-relaxor-electrostrictive-polymers-p-vdf-trfe-cfe-.html For the field of Seismic or Micro-Seismic data collection it is envisioned that the system described in U.S. Pat. No. 7,268,863 may be used for monitoring Seismic waves, which is incorporated herein by reference.

Figure 3:
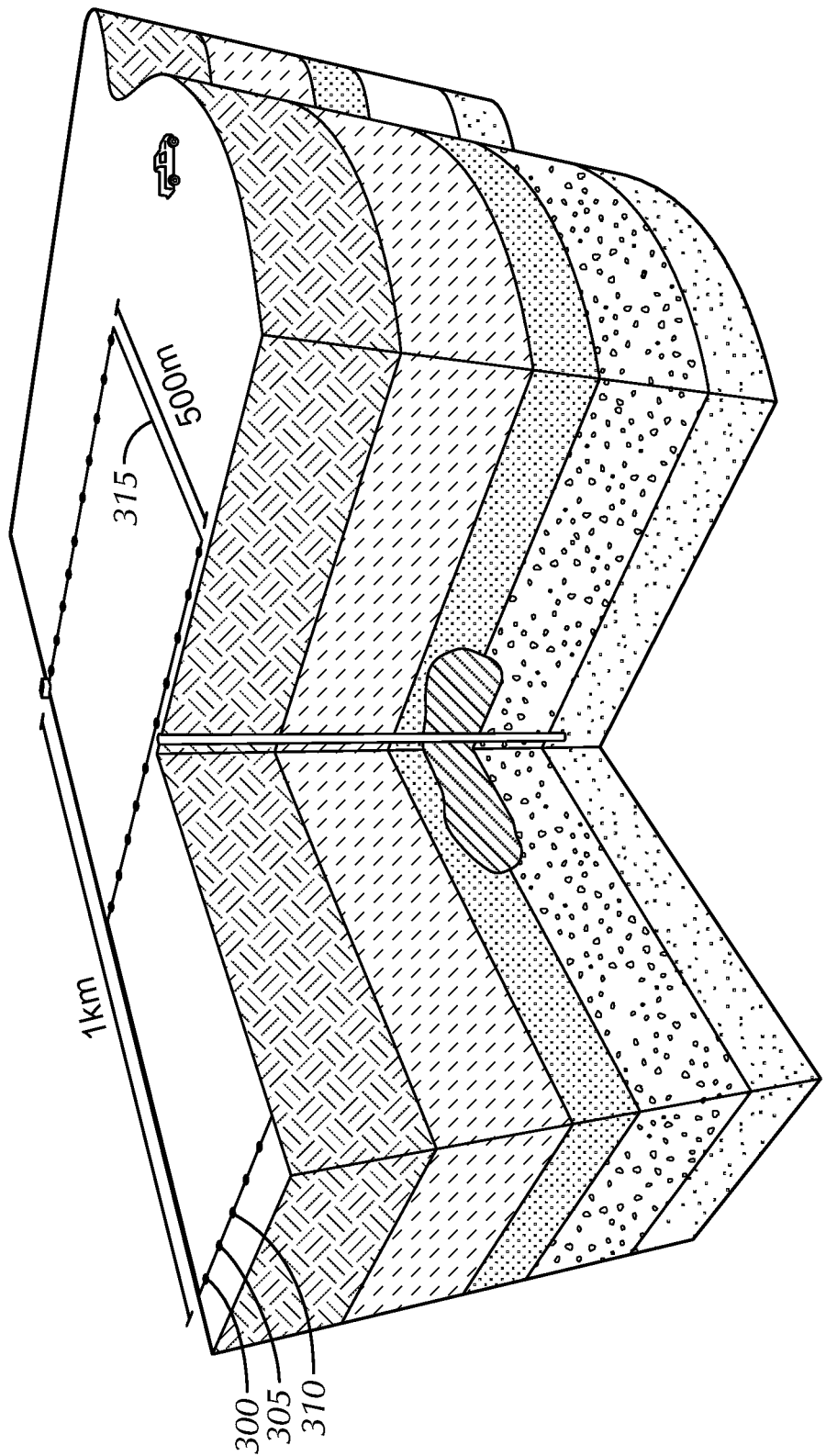
FIG. 3 show an embodiment of a sensor array layout.

Now referring to FIG. 3. The fiber optic magnetostrictive sensor 300, fiber optic piezoelectric sensor 305 and fiber optic pressure wave sensor 310 are created along a length of continuous fiber optic cable and placed in a plurality of locations. The arrangement creates the fiber optic sensor array 315.

For example, the technique describe in U.S. Pat. No. 7,268,863 with the added feature of using Fiber Brag Gratings (FBG) before and after each sensor is used to create a sensor array that will generate data for the magnetic and electric fields returned from the sub surface formations, once they have been excited by an electromagnetic disturbance, naturally occurring or induced by a transmitter.

The sensor array can also be left in place for long term data collection enabling passive monitoring or timed active monitoring.

An important aspect of this system that the signals be temperature and pressure compensated. Since the effect of temperature on the fiber is linear in our region of interest and very slowly changing compared to the signal of interest, it is relatively easy to remove the effect. This can be verified by providing a similar fiber that is in the same environment as the sensing fiber and recording deviations due to temperature. Additionally, the system can also be sensitive to pressure waves. The changes are extremely weak in the operating mode and can be ignored.

The sensor array layout depicted in FIG. 3 is illustrative of one arrangement. And while the receivers 301 are evenly space in FIG. 3, they may also be randomly distributed or placed in some other geometric arrangement. These distributions affect the way in which an interferogram will display data and will result in more information or less information being developed for specific subsurface regions.

What is claimed is:

1. An electromagnetic sensitive fiber optic sensor, comprising:
   a first fiber optic wrapped cylinder, comprising:
      a cylinder portion with a hole through the center, wherein a surface of the cylinder portion includes a magnetostrictive material that changes in length in response to a magnetic field;
      a pair of flux concentrators positioned at each end of the cylinder portion; and
      a pre-stressed bend-insensitive fiber optic cable threaded through the cylinder portion and wrapped around the cylinder portion a predetermined number of times, wherein the fiber optic cable is rigidly attached to the cylinder portion at each end of the magnetostrictive material,
   wherein the number of times is proportional to a sensitivity of the sensor.

2. The electromagnetic sensitive fiber optic sensor of claim 1, wherein the magnetostrictive material is Terfenol-D (TbDyFe).

3. An electromagnetic sensitive fiber optic sensor, comprising:
   a first mandrel formed of a magnetorestrictive or piezoelectric material;
   a second mandrel, formed about the first mandrel in an orthogonal orientation; and
   a fiber optic cable wrapped around an outer surface of the second mandrel,
   wherein the first mandrel comprises a preloaded relaxor electrostrictive polymer.

4. The electromagnetic sensitive fiber optic sensor of claim 3, wherein the magnetostrictive material is Terfenol-D (TbDyFe).

5. The electromagnetic sensitive fiber optic sensor of claim 1, further comprising:
   a pair of fiber brag gratings, positioned within the fiber optic cable at each end of the magnetostrictive material.

6. The electromagnetic sensitive fiber optic sensor of claim 1, further comprising a second and third fiber optic wrapped cylinder,
   wherein the first, second, and third fiber optic wrapped cylinders are orthogonally positioned relative to each other, forming a three axis fiber optic electromagnetic fiber optic sensor.

7. A method of detecting electromagnetic fields returned from a subsurface formation, comprising:
   generating an electromagnetic disturbance in the subsurface formation;
   placing an array of electromagnetic sensitive fiber optic sensors above the subsurface formation; and
   detecting an effect of electromagnetic fields returned from the subsurface formation by the array of electromagnetic sensitive fiber optic sensors,
   wherein each of the array of electromagnetic sensitive fiber optic sensors comprises:
      a fiber optic wrapped cylinder, comprising:
         a cylinder portion with a hole through the center, wherein a surface of the cylinder portion includes a magnetostrictive material that changes in length in response to a magnetic field;
         a pair of flux concentrators positioned at each end of the cylinder portion; and
         a pre-stressed bend-insensitive fiber optic cable threaded through the cylinder portion and wrapped around the cylinder portion a predetermined number of times, wherein the fiber optic cable is rigidly attached to the cylinder portion at each end of the magnetostrictive material, wherein the number of times is proportional to a sensitivity of the sensor.

8. The method of claim 7, further comprising:
providing a second fiber optic cable similar to the fiber optic cable of each of the array of electromagnetic sensitive fiber optic sensors; and
compensating for temperature effects by recording deviations due to temperature in the second fiber optic cable.

9. A method of detecting electromagnetic fields returned from a subsurface formation, comprising:
generating an electromagnetic disturbance in the subsurface formation;
placing an array of electromagnetic sensitive fiber optic sensors above the subsurface formation; and
detecting an effect of electromagnetic fields returned from the subsurface formation by the array of electromagnetic sensitive fiber optic sensors,
wherein each of the array of electromagnetic sensitive fiber optic sensors comprises:
a first mandrel, formed of a magnetostrictive or piezoelectric material;
a second mandrel, formed about the first mandrel in an orthogonal orientation; and
a fiber optic cable wrapped around an outer surface of the second mandrel.

10. The method of claim 9, further comprising:
providing a second fiber optic cable similar to the fiber optic cable of each of the array of electromagnetic sensitive fiber optic sensors; and
compensating for temperature effects by recording deviations due to temperature in the second fiber optic cable.

* * * * *